Patented Dec. 19, 1939

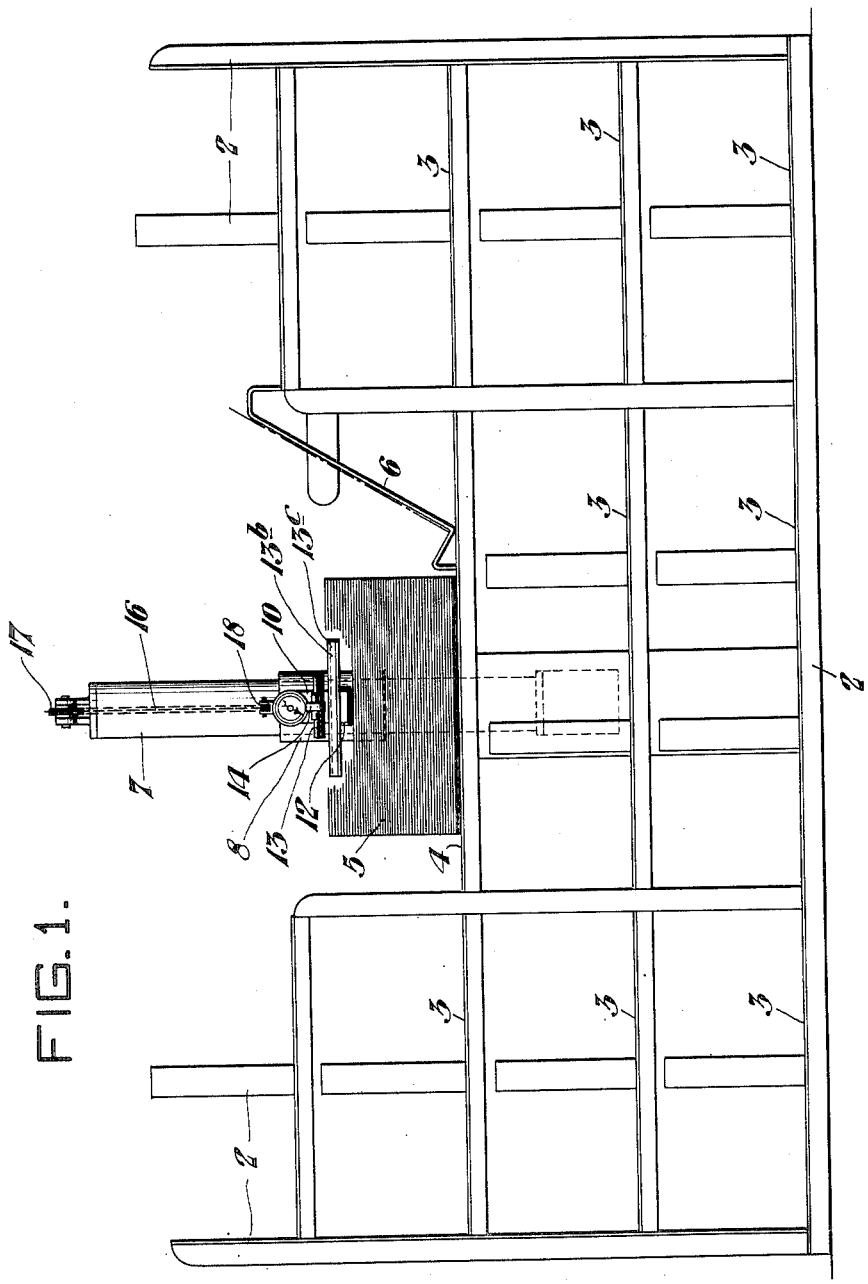

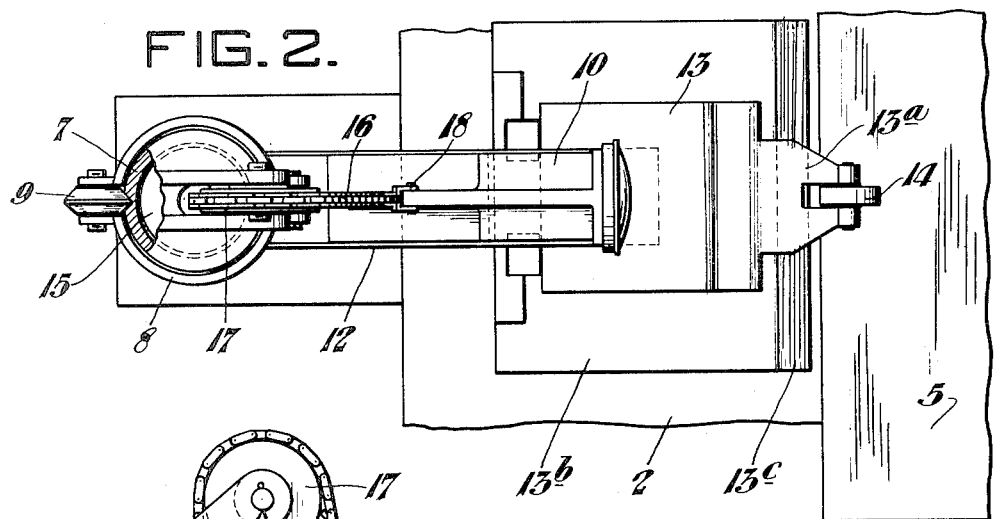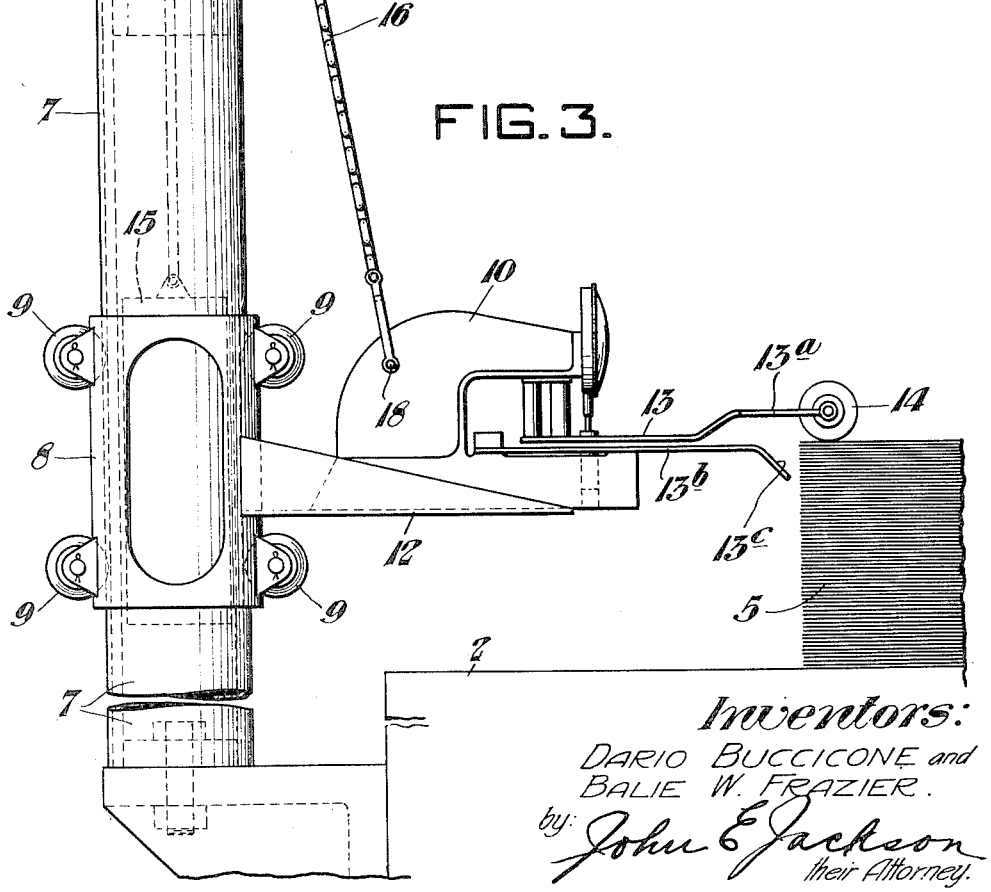

2,184,036

UNITED STATES PATENT OFFICE 2,184,036

APPARATUS FOR GAUGING SHEET MATERIAL

Dario Buccicone and Bailie W. Frazier, Gary, Ind.

Application October 8, 1938, Serial No. 234,020

9 Claims. (Cl. 33—147)

This invention relates to the gauging of sheet material and particularly to an improved apparatus for gauging and sorting sheet material, such as metallic sheets and the like.

It is often times desirable during the manufacture of sheet material, and especially of metallic sheets which are off-weight, to determine the weight thereof and sort them accordingly. This is usually done by means of a thickness gauge. Heretofore it was usually the practice to securely position the gauge adjacent the stack of sheets to be gauged, remove each sheets successively from the pile, gauge the thickness thereof and deposit it in the proper bin or shelf of a weight classification rack. At the start of the gauging of a stack of sheets, the gauge was usually so positioned as to be below the top thereof and when the sheets at the bottom of the stack were reached for gauging, the gauge was above the top of the remaining sheets, resulting in excessive lifting and handling of the sheets, which was inconvenient as well as inefficient. Also it was a rather tedious operation to lift the sheets from the top of the stock, properly position them in the gauge and, at the same time, note the gauge reading thereon, and then deposit the sheet in the proper bin or shelf. Furthermore, the operator, in gauging the sheets, occasionally might not get a sheet properly positioned in the gauge; that is, the sheet might be tilted, resulting in an inaccurate gauge reading and, in turn, a wrong classification of the sheet, which, of course, was unsatisfactory.

According to the present invention, the thickness gauge is always positioned directly opposite the topmost sheet of the stack of sheets to be gauged, and there is no unnecessary handling of the sheets during the gauging operation. Also the sheets are always properly positioned in the gauge during the gauging thereof.

It is an object of the present invention to provide an improved, simple and inexpensive apparatus for gauging sheet material which will increase the efficiency of the gauging thereof.

It is another object of this invention to provide an improved apparatus for gauging sheet material which will insure accurate classification thereof and reduce the handling thereof to a minimum.

It is a further object of this invention to provide an apparatus for gauging the thickness of material having a floating gauge associated therewith which is easily and quickly positioned automatically opposite the sheet of material to be gauged.

Various other objects and advantages of this invention will be more apparent in the course of the following specification and will be particularly pointed out in the appended claims.

In the accompanying drawings there is shown, for the purpose of illustration, one embodiment which our invention may assume in practice.

In these drawings:

Figure 1 is a front elevation of a classification rack together with the improved apparatus of our invention for gauging sheet material;

Figure 2 is a plan of the improved gauging apparatus; and

Figure 3 is a side elevation thereof.

Referring more particularly to the drawings, there is shown a classification rack 2 having a plurality of bins or shelves 3 arranged therein for receiving various sized metallic sheets and a table portion 4 positioned preferably centrally thereof on which a stack 5 of sheets to be gauged are adapted to be positioned. There is mounted on the table 4, preferably to one side thereof, an inclined shelf 6.

According to the present invention, there is positioned on the back side of the rack 2, preferably centrally of the table portion 4, a vertical rigid support 7 which may be suitably arranged on the back side of the rack 2 or securely positioned on a stand located on the floor or otherwise suitably mounted. This rigid support is preferably a hollow cylindrical member, preferably made of cast iron or any other suitable material. There is arranged on the vertical support 7, a carriage 8, for vertical movement thereon, and having a plurality of suitable rollers or wheels 9 associated therewith which are adapted to co-operate with means arranged on the cylindrical member 7 to guide the carriage in its vertical movement. In the present instance, there is provided rollers having V-shaped peripheries which are adapted to track in V-shaped guide grooves arranged in the cylindrical or tubular member 7, to guide the carriage 8. It will, of course, be understood that any other suitable means may be provided for guiding the carriage vertically.

There is preferably arranged on the front side of the carriage 8, a suitable bench-type gauge 10, which is preferably carried by an outwardly extending arm 12 associated with the carriage 8 but which, of course, can be mounted on the carriage in any other suitable manner. The type of gauge used should have an upper guide plate 13 having preferably an offset outer portion 13ᵃ on which there is arranged preferably a roller or wheel 14 on the end thereof, and a lower guide plate 13b having preferably a downwardly turned outer end portion 13c.

There is positioned in the hollow portion of the cylindrical support 7, a counter-weight 15, connected to one end of preferably a chain 16, or other suitable means, which extends upwardly over a pulley or sprocket wheel 17 suitably positioned on top of the cylindrical support with the other end of the chain connected to the carriage 8 or to the gauge 10 carried thereby at 18, as shown. The counter-weight 15 should be at least equal to the combined weight of the carriage 8, the arm 12 carried thereby and the gauge 10, together with the parts associated therewith, so that they are evenly balanced, but it is preferable that the weight of the counter-weight 15 be a little less than the weight of the carriage together with the carriage 8 and gauge 10 and the parts associated therewith, so as to permit limited downward movement thereof, and consequently, the downward force of the carriage together with the gauge carried against the topmost sheet of the stack.

The improved apparatus for our invention for gauging metallic sheets and the like operates in the following manner:

The carriage 8, together with the gauge 10, is first moved to its uppermost position in its travel on the cylindrical support 7. If desired, means may be provided for retaining the carriage in its uppermost position on the support when not in use but there is no such means shown in connection with the present invention. The stack 5 of sheets to be gauged is then positioned on the table 4 of the rack 2 in under the guage 10 so that the roller 14 carried by the guide plate 13 will rest on top of the stack in its downward movement, and at the same time, be out of the path of movement of the outer portion 13c of the lower guide plate 13b in the downward movement of the carriage. The carriage 8, together with the gauge 10, is then permitted to move downwardly on the cylindrical support 7 until the roller 14 contacts the topmost sheet of the stack, which positions the gauge 10 directly opposite the topmost sheet of the stack. The topmost sheet is then slidingly moved into the gauge over the lower guide plate 13b, the thickness thereof noted, and the sheet removed and deposited in the proper bin or shelf 3 of the rack 2, or on the inclined shelf 6, from where it is directed to some other point in the manufacture. After the top sheet has been gauged, it will be seen that as it is removed from under the roller 14, the carriage 8, together with the gauge 10, is permitted again to move downwardly until the roller 14 contacts the next sheet which positions the gauge directly opposite this sheet. These operations are repeated until the entire stack of sheets have been gauged and classified.

It will be seen that with the use of our invention, the sheets in each instance are slid from the top of the stack into the gauge and slid therefrom after the gauging operation, and that the only time that it is necessary for the operator to handle the sheets is when he removes the sheets from the top of the stack after the gauging thereof for deposit in one of the bins or shelves in the rack.

While we have shown and described one embodiment of our invention, it will be understood that this embodiment is merely for the purpose of illustration and description and that various other forms may be devised within the scope of our invention, as defined in the appended claims.

We claim:

1. Apparatus for determining the thickness of sheet material including, in combination, a rigid support, a thickness gauge mounted on said support for vertical movement thereon, and means carried by said gauge which is adapted to engage with the topmost sheet for positioning said gauge in its downward movement on said support successively opposite the topmost sheet of a stack of sheets to be gauged as the sheets are successively gauged and removed therefrom.

2. Apparatus for determining the thickness of sheet material including, in combination, a rigid support, a thickness gauge mounted on said support for vertical movement thereon, means carried by said gauge for contacting the topmost sheet of a stack of sheets to be gauged so as to position said gauge in its downward movement on said support successively opposite the topmost sheet thereof as the sheets are successively gauged and removed therefrom, and means for limiting the downward movement of said gauge on said support.

3. Apparatus for determining the thickness of sheet material including, in combination, a rigid support, a thickness gauge mounted on said support for vertical movement thereon, means carried by said gauge for contacting the topmost sheet of a stack of sheets to be gauged so as to position the gauge opposite said topmost sheet, and means for balancing said gauge so as to limit the downward force of said contacting means against said topmost sheet.

4. Apparatus for determining the thickness of sheet material including, in combination, a rigid support, a carriage mounted on said support for vertical movement thereon, a thickness gauge securely mounted on said carriage, and means carried by said gauge which is adapted to engage with the topmost sheet for positioning said carriage together with the gauge carried thereby in its downward movement on said support so as to position the gauge successively opposite the topmost sheet of a stack of sheets to be gauged as the sheets are successively gauged and removed therefrom.

5. Apparatus for determining the thickness of sheet material including, in combination, a rigid support, a carriage mounted on said support for vertical movement thereon, a thickness gauge securely mounted on said carriage, a roller arranged on the outer end of said gauge for contacting the topmost sheet of a stack of sheets to be gauged so as to position the gauge opposite said topmost sheet, and means for balancing said carriage together with the gauge carried thereby so as to limit both the downward force of said contacting roller against said topmost sheet and the downward movement of the carriage and gauge.

6. Apparatus for determining the thickness of sheet material including, in combination, a hollow rigid support, a carriage mounted on said support for vertical movement thereon, a thickness gauge securely mounted on said carriage, a roller arranged on the outer end of said gauge for contacting the topmost sheet of a stack of sheets to be gauged, and a counterweight arranged in the hollow portion of said support for balancing said carriage together with the gauge carried thereby so as to limit both the downward force of said contacting roller against said topmost sheet and the downward movement of the carriage and gauge.

7. Apparatus for determining the thickness of sheet material including, in combination, a rigid support, a carriage mounted on said support for vertical movement thereon, a thickness gauge securely mounted on said carriage, means carried by said gauge for contacting the topmost sheet of a stack of sheets to be gauged so as to position the gauge in its downward movement on said support successively opposite the topmost sheet as the sheets are gauged and removed therefrom, and means for balancing said carriage together with the gauge carried thereby so as to limit the downward movement of said carriage together with the gauge on said support.

8. Apparatus for determining the thickness of sheet material including, in combination, a rigid support, a thickness gauge mounted on said support for vertical movement thereon, said gauge adapted to move downwardly on said support opposite a stack of sheets to be gauged, means carried by said gauge for contacting the topmost sheet of the stack as the sheets are successively gauged and removed therefrom so as to position said gauge successively opposite the topmost sheet of the stack, and a counter-weight for balancing said gauge so as to limit the downward movement thereof.

9. Apparatus for determining the thickness of sheet material including, in combination, a rigid support, a thickness gauge mounted on said support for vertical movement thereon, said gauge adapted to move downwardly on said support due solely to the weight thereof opposite a stack of sheet material to be gauged, and means carried by said gauge which rests successively on the topmost sheet of the stack as the sheets are gauged and removed therefrom so as to position the gauge successively opposite and in alignment with the topmost sheet thereof.

DARIO BUCCICONE.
BAILIE W. FRAZIER.